US011140757B2

(12) United States Patent
Susin et al.

(10) Patent No.: US 11,140,757 B2
(45) Date of Patent: Oct. 5, 2021

(54) SYSTEM FOR MONITORING THE IRRADIATION OF AN OBJECT WITH LIGHT

(71) Applicant: Osram GmbH, Munich (DE)

(72) Inventors: Inna Susin, Munich (DE); Guido Angenendt, Munich (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 16/790,749

(22) Filed: Feb. 14, 2020

(65) Prior Publication Data

US 2020/0267813 A1    Aug. 20, 2020

(30) Foreign Application Priority Data

Feb. 15, 2019 (DE) ............... 10 2019 202 070.4

(51) Int. Cl.
| H05B 45/14 | (2020.01) |
| H05B 47/19 | (2020.01) |
| H05B 47/16 | (2020.01) |
| H05B 45/20 | (2020.01) |

(52) U.S. Cl.
CPC ............ *H05B 45/14* (2020.01); *H05B 45/20* (2020.01); *H05B 47/16* (2020.01); *H05B 47/19* (2020.01)

(58) Field of Classification Search
CPC ........ H05B 45/14; H05B 47/19; H05B 47/16; H05B 45/20; H05B 47/11
USPC ........................................................ 315/291
See application file for complete search history.

(56) References Cited

U.S. PATENT DOCUMENTS

| 2007/0258243 A1* | 11/2007 | Segall | ............ H05B 47/10 |
| | | | 362/276 |
| 2010/0259174 A1* | 10/2010 | Hou | .............. G01S 15/04 |
| | | | 315/149 |

FOREIGN PATENT DOCUMENTS

| DE | 4413111 A1 | 10/1995 |
| DE | 102017108036 A1 | 10/2018 |
| WO | 2013017287 A1 | 2/2013 |

OTHER PUBLICATIONS

Colby, K. M., "A Suggested Exhibition /Exposure Policy for Works of Art on Paper", Journal of the International Institute for Conservation-Canadian Group (J.IIC-CG), 1992, 24 pages, vol. 17.
Thomson, G., "The Museum Environment", 1994, 8 pages, 2nd Edition, Butterworth-Heinemann, Oxford, Great Britain.
(Continued)

*Primary Examiner* — Don P Le
(74) *Attorney, Agent, or Firm* — Viering, Jentschura & Partner mbB

(57) ABSTRACT

A system for monitoring the irradiation of an object with light from a luminaire includes the luminaire having one or more light sources, which emit light having a spatial radiation pattern; a computing unit, connected to the luminaire and set up to acquire information about an illuminance of the light of the light sources; a first memory, connected to the computing unit and in which information about spatial positioning of the luminaire relative to a surface of the object is stored; and a second memory, connected to the computing unit and in which information about the spatial radiation pattern of the light sources is stored. The computing unit may calculate and output a local intensity of light incident at the respective position on the basis of illuminance information, the spatial radiation pattern of the light sources, and the spatial positioning of the luminaire relative to the surface of the object.

16 Claims, 3 Drawing Sheets

(56) References Cited

OTHER PUBLICATIONS

Waller, C., "Licht und Lichtschutz im Museum", http://www.cwaller.de/deutsch.htm?lichtschaeden.htm~information, 2010, 8 pages.
German search report issued for the corresponding DE application No. 10 2019 202 070.4, dated Nov. 19, 2019, 9 pages (for informational purposes only).

* cited by examiner

SYSTEM FOR MONITORING THE IRRADIATION OF AN OBJECT WITH LIGHT

CROSS-REFERENCE TO RELATED APPLICATION

This application claims priority to German Patent Application Serial No. 10 2019 202 070.4, which was filed Feb. 15, 2019, and is incorporated herein by reference in its entirety.

TECHNICAL FIELD

Various embodiments relate generally to a system for monitoring the irradiation of an object with light from a luminaire.

BACKGROUND

Such a system can be used for example for works of art, such as paintings, graphics, photographs or lithographs, textile compositions etc., to protect them against damage caused by the excessive incidence of radiation. Such objects are typically irradiated with light having a frequency spectrum and an irradiance on the surface of the object or of the artwork that are adapted to a light sensitivity of the irradiated material by way of appropriately placed luminaires, preferably spotlights, in order to make the aforementioned objects accessible to public viewings for example in a museum or at exhibitions.

The aforementioned damage can have various physical or chemical causes. For one, absorption of high-energy light quanta of the incident radiation can set off a process of photochemical decomposition in the molecules of the corresponding object surface. Since specific activation energies must be exceeded for a corresponding direct splitting of the molecules to occur, it is clear that short-wave light, e.g. UV light, can cause greater damage in this respect.

In addition, chemical reactions can also be caused by the absorption of light by contaminants or foreign substances, referred to as sensitizers, which transfer the absorbed energy to the actual reaction partner. The frequently long-chain polymer molecules can then be destroyed by the production of free radicals (oxidation) or catalysis. Temperature and air humidity can also play a role here. At any rate, even longer-wave light e.g. in the visible wavelength range can already have a damaging effect here on the surface of the object.

In addition, even light in the infrared wavelength range can already cause damage, for example owing to thermal expansion of the surface (mechanical stress) or owing to damage based on dryness with the consequence of crack formation, or owing to phase transitions in plastics or glass materials that are in some cases initially not visible with unpredictable consequences for the surface condition.

As a consequence, it is clear that the material and substance properties of the irradiated object surface have an important role with respect to a corresponding lightfastness of the objects. This applies e.g. to the numerous color pigments used in artist colors. Therefore, the latter—and also binders and carrier materials such as paper or textiles—are typically divided into light sensitivity categories or lightfastness classes, which then make it possible for the exhibitors to take individually limiting measures with respect to the exposure of the objects to light.

For reasons of general comprehensibility and also easier verifiability, however, museums typically use simplified rules that define common limits for maximum illuminance, for example 50 lx for paper and textiles or 150 lx for oil paintings without distinguishing in accordance with pigments etc. Yet this standardized approach prevents good lighting of low-contrast, delicate objects in cases where lightfast pigments or materials that make careful study difficult e.g. in older people were nevertheless used. This approach also neglects spectrally dependent light sensitivity.

The total radiation exposure accumulated over time, which can be determined for example as part of a monitoring operation using what are known as blue scales or Light-Check strips, is generally also paramount. Furthermore, measurements using what are known as light data loggers can also be performed. A specific example of such a system proposes to fixedly connect (i.e. integrally or in a form-fitting manner) a sensor unit that is operable as a light data logger utilizing an electronic warning system to the object and to use a sensor element to regularly record the light irradiation at short intervals. The measurement values can be buffered in a data memory of the sensor unit and be transmitted to an evaluation unit via radio. The evaluation unit calculates a total radiation exposure from the measurement values using temporal integration and derives therefrom for example a resulting color deviation (due to bleaching) and a remaining useful life on the basis of a conservational model that is specifically assigned to said object. Users can read these data for example via the Internet. As a result, a quantity of light that has been adapted to the object can be used.

However, such a system still has the problem that the objects are often not lit homogeneously. The intensity maximum of the illumination is typically located at the center of the object rather than at the periphery, even though this is the only place where a light data logger can typically be placed to be useful. The latter will therefore typically measure not the actual light irradiation but rather solely a representative value, the validity of which, however, takes the concrete situation into account only to a limited extent.

SUMMARY

A system for monitoring the irradiation of an object with light from a luminaire includes: the luminaire having in each case one or more light sources, which together emit light having a spatial radiation pattern; a computing unit, which is connected to the luminaire and is set up to acquire information relating to an illuminance of the light emitted by the light sources; a first memory, which is connected to the computing unit and in which information relating to the spatial positioning of the luminaire in relation to a surface of the object is stored; and a second memory, which is connected to the computing unit and in which information relating to the spatial radiation pattern of the light sources is stored. The computing unit is designed to calculate and output for a multiplicity of positions on the surface of the object in each case a local intensity of the light that is incident at the respective position on the basis of the information relating to the illuminance, the information relating to the spatial radiation pattern of the light sources, and the information relating to the spatial positioning of the luminaire relative to the surface of the object.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
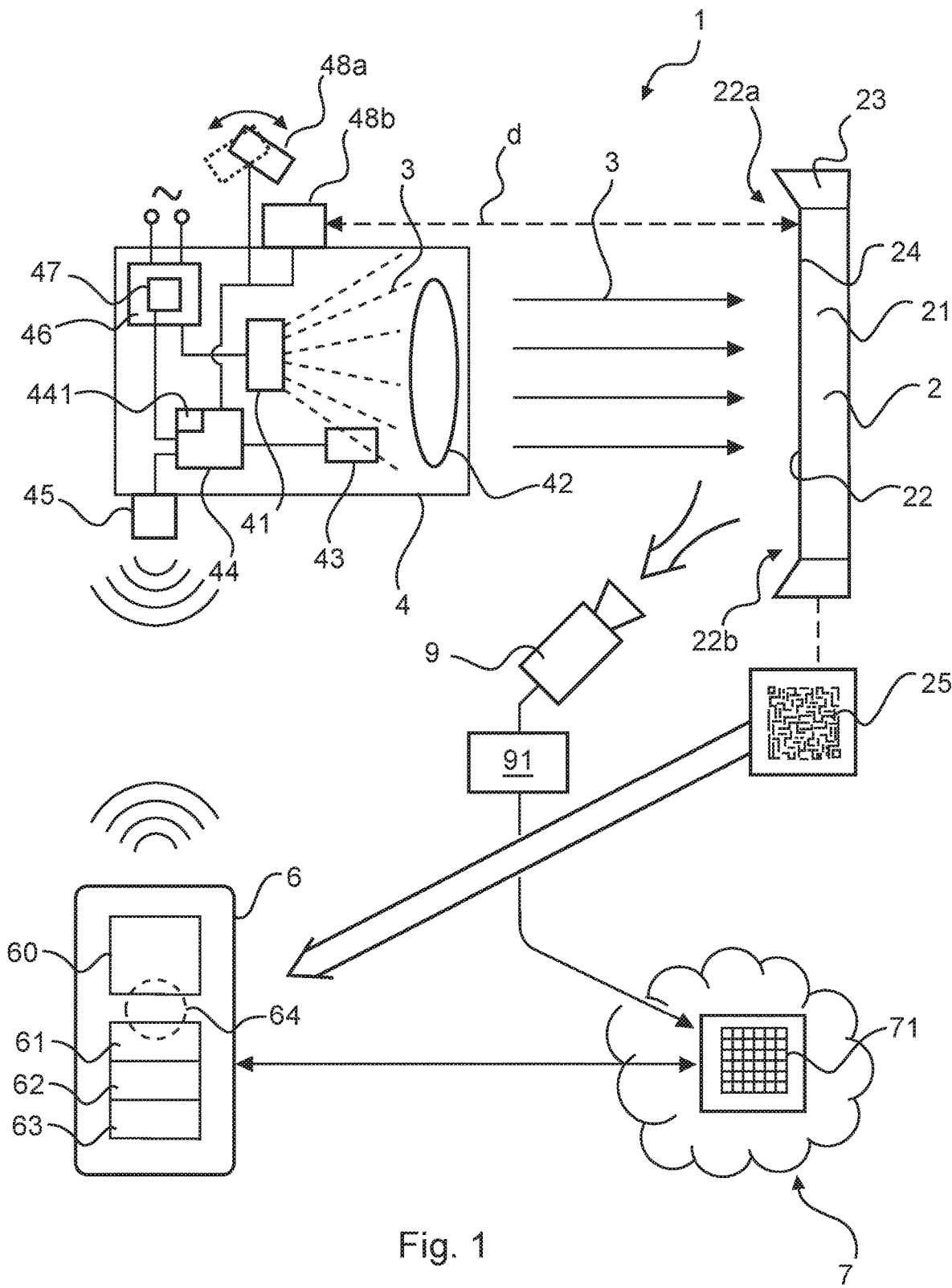
FIG. 1 shows a schematic illustration of an overview of a system for monitoring the irradiation of an object with light from a luminaire according to various embodiments.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments propose a system for monitoring the irradiation of an object with light from a luminaire that offers an improvement of the situation described and offers e.g. a further improved assessment with respect to any damage that may occur for a given object and a given light irradiation and to more precisely prevent that damage by way of said monitoring.

Various embodiments provide a system for monitoring the irradiation of an object with light from a luminaire and a corresponding method. Developments of the system according to various embodiments form the subject matter of the dependent claims.

The system for monitoring the irradiation of an object with light from a luminaire may include the luminaire having in each case one or more light sources, which together emit light having a spatial radiation pattern. Furthermore, a computing unit may be provided, which is connected to the luminaire and is set up to acquire information relating to an illuminance of the light emitted by the light sources. The luminaire can be, for example, a spotlight comprising one or more LEDs (light-emitting diodes) or the like. However, the embodiments are not limited to specific configurations of luminaires. The luminaire should be considered to be a physical unit. It may have a housing in which the light sources and further functional units that will be described below can be accommodated, such as e.g. expansion or focusing optics, that is to say for example correspondingly arranged lenses and/or reflectors.

The computing unit can be a processor unit with programming technology, which is designed for performing the calculations described below, that is to say it can have a memory with correspondingly stored and retrievable, executable programs. The computing unit is connected to the luminaire. The connection may be a data connection. The luminaire may have a control apparatus for this purpose that is set up to transmit the information relating to the illuminance that is to be retrieved in the form of data. The connection may include or consist of a physical data line (inter alia cable) or be of a wireless nature, or a combination of both.

The computing unit can be arranged on the luminaire itself and be directly connected thereto. Alternatively, it may also be set up in a cloud, wherein it can be connected to the luminaire for example via the Internet and then in situ specifically by way of a router, a switch and an access point. Using a bridge, it is also possible to establish a connection in a building control system for the luminaire, such as DALI, KNX or ZigBee.

In various embodiments, the computing unit is designed as a smartphone or as a mobile hand-held control and display unit that makes it possible for a user of the system to monitor and control the system by way of displays. The computing capacity is provided in this case by the corresponding processor of the smartphone.

The system furthermore provides a first memory, which is connected to the computing unit and in which information relating to the spatial positioning of the luminaire in relation to a surface of the object is stored.

In various embodiments, this information relating to the spatial positioning of the luminaire relative to a surface of the object can include e.g. data concerning a distance between the light source, or light sources, and a reference point for the surface of the object and also a tilt angle at which the luminaire is positioned in deviation from a surface normal or from a plane of the surface. The reference point can also be situated at the upper end of a wall on which the object is placed or hung, for example if the luminaire is attached to a ceiling.

Alternatively, the information can also merely include coordinates of the luminaire and of the surface of the object in a reference coordinate system. At any event, the information include data that permit geometric calculation of the radiation of the luminaire to positions on the surface of the object by way of the computing unit.

The information relating to the spatial positioning is stored in the first memory. This may involve short buffering of optionally automatically or dynamically determined measurement values or a manual input of values determined in another way (coordinates, distances, angles, etc.). Like the computing unit, the first memory can be located for example in the cloud or in the smart phone, etc. The connection between the computing unit and the first memory is of any desired type and merely implies the selective data access from the computing unit.

The system for monitoring furthermore has a second memory, which is connected to the computing unit and in which the aforementioned spatial radiation pattern of the light source(s) or of the luminaire as a whole (including optics) is stored. The radiation pattern refers to a direction-dependent emission of the light from a luminaire with reference to a value that is determined for a main direction along an optical axis, wherein the radiation pattern can be influenced by stops, lenses, grids, or reflectors of the luminaire. The radiation pattern can be symmetric (preferably in the case of spotlights, emitters, or downlights) or asymmetric (preferably floodlights).

The radiation pattern is stored in the form of data in the second memory, wherein the representation is arbitrary. What is important is the specification of an optical axis of the luminaire relative to which the illuminance can be stated in dependence on the direction angle. For example, an intensity distribution within a plane perpendicular to said optical axis can be specified, wherein the point of intersection of the axis with the plane represents the reference point. It should be noted that the orientation of the optical (or geometric) axis of the luminaire relative to the surface of the object can also be part of the above-described information relating to the spatial positioning of the luminaire relative to the surface of the object and can be stored in the first memory. Alternatively, angle-dependent intensities (relative to the optical axis) can also be stored.

The second memory can have properties that are analogous to the first memory (see above). It may also be provided in the same storage module as the first memory and then merely denote a different memory location therein. By way of example, it can be set up in the cloud or in the smartphone and permit selective access by way of the computing unit.

In various embodiments, the computing unit is now designed to calculate and output for a multiplicity of positions on the surface of the object in each case a local intensity of the light that is incident at the respective position on the basis of the information relating to the illuminance, of the spatial radiation pattern of the light source(s), and of the information relating to the spatial positioning of the luminaire relative to the surface of the object.

Such a calculation is substantially a geometric calculation, wherein the absolute distance from the luminaire, the tilt of the surface relative to the direction of the luminaire, and the direction-dependent attenuation of the radiation with respect to the oriented optical axis of the luminaire are included in the intensity that is ascertained at each position on the surface. A further factor that is included is for example the illuminance that is transmitted by the luminaire or stored in the computing unit in another way. The illuminance represents the intensity of the light sources used in the luminaire and can—especially in the case of LEDs—take into account a level of aging of the light sources, which regularly results in a decrease of the luminous flux emitted thereby over time.

The system according to various embodiments consequently makes possible a position-exact determination of the radiation exposure over the surface of the object, e.g. of an artwork, with a local resolution. The irradiation exposures determined in this manner can now be compared for example to light sensitivities on the surface of the object that have been determined locally in a similar manner. Relatively small but particularly light-sensitive surface regions are therefore accounted for in the monitoring to a much more appropriate extent. The intensity, orientation, and possibly also the wavelength range of the luminaire or of the light source(s) used therein can also be adapted in dependence on the values that are output, especially to limit exposure of the light-sensitive partial regions.

In various embodiments, the system includes a light sensor, which is provided in or next to the luminaire and is designed to measure the illuminance of the light in the luminaire emitted by the light source(s), wherein the computing unit is connected to the light sensor to receive the information relating to the measured illuminance. In this way, the aging of the light source(s) can be taken into account in a calculation of the irradiation exposure. On account of the age-related decrease of the radiant power, it is indeed lower than if a constant radiant power were assumed. This also contributes to an improvement of the monitoring.

According to an alternative development of the system according to various embodiments, said system may include a time measurement apparatus, for example a clock or a timer, which is designed to output an operating time for the light source(s) during which the light source(s) has/have been operating for irradiating the object since their activation, and a current and/or voltage measurement apparatus, which is designed to measure a current and/or a voltage with which the light source(s) is/are operated. In a third memory, a function or table is stored with which values of an illuminance are on the one hand assigned in each case to a combination of values from a current and/or a voltage and, on the other, to an operating time of the light sources. The computing unit is connected to the time measurement apparatus, the current and/or voltage measurement apparatus, and the third memory and is designed to correspondingly receive in each case the measured values for the current and/or the voltage and also the operating time and to calculate, and thereby obtain, the information relating to the measured illuminance with reference to the function or the table.

The third memory can be set up similarly to the first and/or the second memory (see above) and be located for example in the case of the smartphone, etc. in a common storage module. The aging-related decrease in the radiant power described in the previous development is mapped here via the previously saved function or table in the third memory. Only the current or, indirectly for determining the current, the voltage still needs to be measured, which reduces the cost and the outlay as compared to the light sensor because current measurements may already be available in the consumers in networked illumination systems (e.g. DALI, etc.) and the values can be easily retrieved. In addition, the same effects as when using a light sensor are obtained here.

According to a further development of the system according to various embodiments, the computing unit may be designed to obtain sensitivity information for the object that is to be irradiated, with limit values for a maximum local intensity being stored, possibly accumulated over time (i.e. irradiation exposure for example in units of megalux hours [Mlxh]), for positions on the surface of the object. In this case, light sensitivity categories, for example according to Colby, Karen M.: "*A Suggested Exhibition/Exposure Policy for Works of Art on Paper,*" in: *The Lighting Resource—* Montreal Museum of Fine Arts, (retrieved on Jan. 22, 2019) possibly at http://www.lightresource.com/research-papers/ A-Suggested-Exhibition-Exposure-Policy-for-Works-of-Art-on-Paper.pdf, or ISO categories (e.g. according to the American blue scale) from 1 to 8 are in each case assigned to the positions on the surface after analysis, and these in turn are assigned the limit values, either in units of Mlxh or in Lux with the possible specification of a fixed exposure time per day, week and/or month, etc.

According to a development of this aspect, the computing unit is designed to compare the calculated local intensity for at least one of the multiplicity of positions to a limit value specified in the sensitivity information for this position and to output a signal in dependence on the result. This signal can be used to check the status, for example easily on the smartphone, or to take measures, such as an adaptation of the light switching pattern.

According to a development of this aspect, the signal can be received by a control apparatus, which is connected to the computing unit and is designed to adapt or switch off a power supply of the luminaire or of individual light sources of the luminaire in dependence on the signal. This makes possible a rule-based and thus secure adaptation of the operation of the illumination system with reliable protection of the works of art or objects against damage due to light irradiation.

According to a development of this aspect, the information relating to an illuminance of the light emitted by the light source(s) that is obtained by the computing unit includes details relating to illuminances with respect to one or more different specified wavelength range(s). The sensitivity information for the object that is to be irradiated obtained by the computing unit here includes for the respective positions on the surface of the object in each case limit values for the one or the plurality of different specified wavelength ranges. The computing unit, if it is designed to compare the calculated local intensity for at least one of the multiplicity of positions to a limit value specified in the sensitivity information for said position and to output a signal in dependence on the result, in each case individually performs said comparison for the one or the plurality of different specified wavelength range(s). With this aspect, even more precise monitoring broken down by wavelength ranges becomes possible. By way of example, local light sensitivities specifically in the UV or IR range can be taken into account here separately from one another.

According to one development of the aspect, the luminaire or a mobile unit of the system that is wirelessly connected to the luminaire furthermore has a camera with which the surface of the object can be scanned to obtain color and/or brightness values for positions on the surface, wherein the computing unit is designed to receive the position-dependent color and/or brightness values from the camera and to calculate a limit value for each of the positions on the basis of a fixedly specified assignment between the color and/or brightness values and a sensitivity. This makes possible a fast and efficient analysis of the object surface with the objective of the locally resolved limit value determination for the abovementioned sensitivity information.

According to an alternative development of the aspect, a mobile unit that is wirelessly connected to the luminaire furthermore has a camera or an apparatus for near-field communication, with which an identifier provided on the object can be read, which identifier makes access to the sensitivity information for the object to be irradiated that is stored in a fourth memory possible. The identifier can be for example a QR code or a correspondingly programmed NFC tag, which can be read for example with the smartphone and is individually assigned to the object. Said fourth memory may be set up to be generally accessible in a cloud. If the object is moved for example to a different exhibition or to a different museum, the new user can access the surface that has previously been "mapped" with respect to the sensitivity information, without the need to create a new one.

According to one development of the aspect, the mobile unit that is wirelessly connected to the luminaire is a smartphone in which the computing unit is set up, wherein the first, the second and/or the third memory is/are set up in the smartphone or in a cloud that is accessible for the smartphone. The luminaire or the illumination system operating the luminaire to this end may have a receiving and transmission unit, for example a wireless access point, etc.

According to a development of the system according to various embodiments, the information relating to the spatial positioning of the luminaire relative to a surface of the object includes e.g. data concerning a distance between the light source(s) and a reference point for the surface of the object and also a tilt angle at which the luminaire is positioned in deviation from a surface normal or from a plane of the surface. The angle in the general case can be a solid angle. This is because the connecting line between the center of the luminaire and the center of the object does not need to be located in a plane with the surface normal of the object.

According to a development of this aspect, the luminaire has a distance sensor, e.g. an ultrasonic sensor, which is designed to measure a distance between the luminaire and the surface or a reference point therefor and to transmit the measurement result to the computing unit. In this way, the system can be configured in an automated process.

According to a development of this aspect, the system furthermore may have a tilt angle sensor, which may be provided in the luminaire or on the surface of the object and is designed to measure a tilt angle at which the luminaire is positioned in deviation from a surface normal or from a plane of the surface and to transmit the measurement result to the computing unit. In this way, too, the system can be configured in an automated process.

According to a development of the system according to various embodiments, the spatial radiation pattern of the light source(s) includes data with a two-dimensional distribution of intensities on an area, or in each case on a plurality of areas with different distances from the light source(s), perpendicular to an optical axis of the light emitted by the light sources of the luminaire. The computing unit is designed here to effect the local intensity at the respective positions on the surface of the object on the basis of mathematical projection or an interpolation or extrapolation starting from the one area or between the plurality of areas. This makes possible a secure and efficient calculation of the local intensity at the positions on the surface of the object.

It is likewise possible to make the underlying calculation for monitoring the irradiation of an object available to third parties via appropriate interfaces (software as a service (SaaS) or platform as a service (PaaS)).

In various embodiments, a method for monitoring the irradiation of an object with light from a luminaire is also provided, including:

irradiating the object with light from one or more light source(s) of the luminaire with a spatial radiation pattern, providing information relating to an illuminance of the light emitted by the light source(s) in a computing unit, transmitting information relating to the spatial positioning of the luminaire relative to a surface of the object, transmitting information relating to the spatial radiation pattern of the light source(s) to the computing unit, in each case calculating, by way of the computing unit, for a multiplicity of positions on the surface of the object, a local intensity of the light that is incident at the respective position from the provided information relating to the illuminance, from the information relating to the spatial radiation pattern of the light source(s), and from the information relating to the spatial positioning of the luminaire relative to the surface of the object, outputting the calculation result.

The result may provide the same effects as were described with respect to the system and the developments thereof. By way of example, the calculation result with the values for the local intensity can also be compared to specified or previously determined information relating to the light sensitivity, which specifies individual limit values for corresponding positions on the surface of the object. The calculated local intensity can be compared to the limit values for a multiplicity of such positions, and a signal can be output in dependence on the result. Measures can be taken in dependence on said signal, such as adapting (reducing or even increasing) the power supply of the luminaire or of the light source(s) or switching them off, etc.

Figure 2:
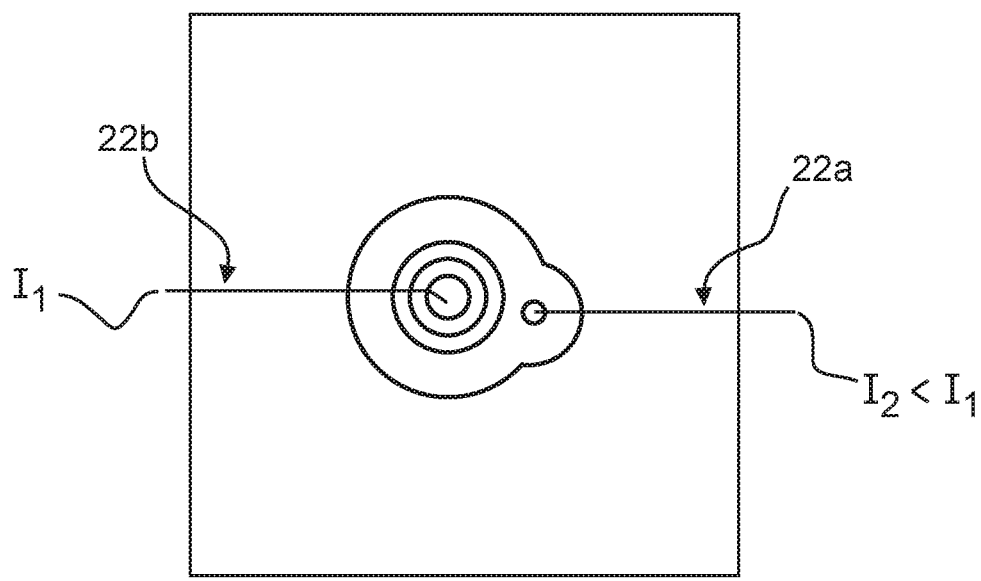
FIG. 2 shows an intensity distribution on a surface of the object, as is calculated by the computing unit from FIG. 1.
Figure 3:
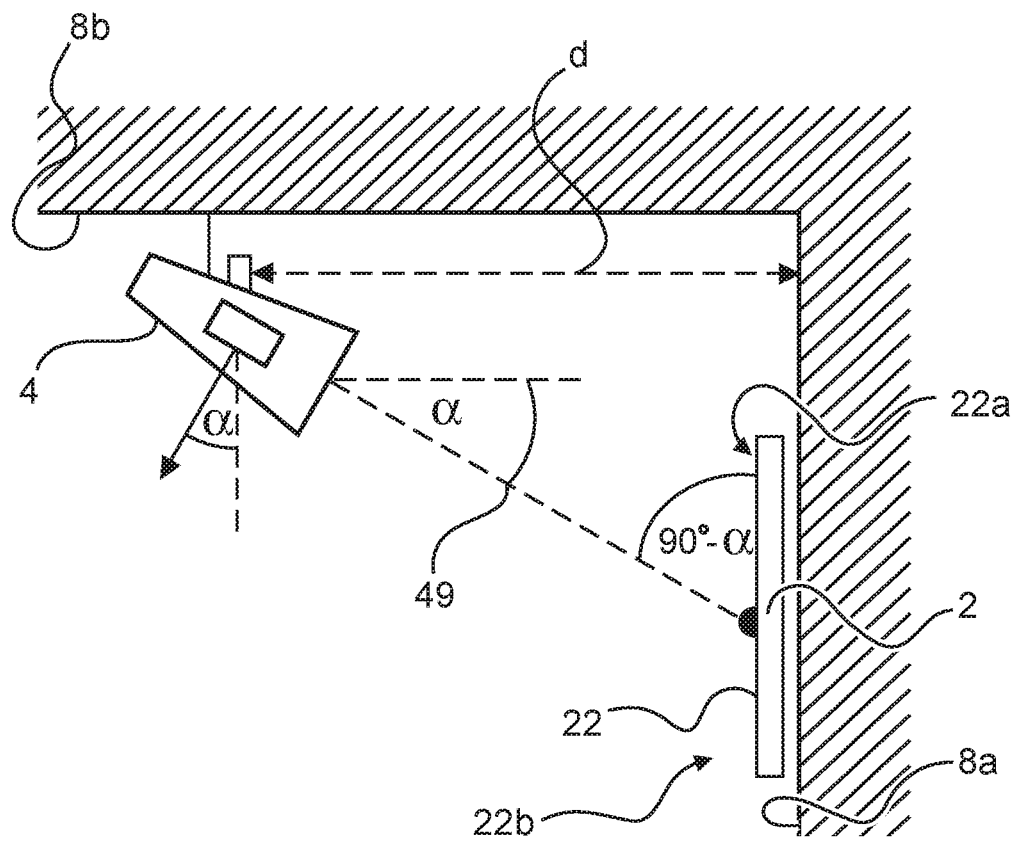
FIG. 3 shows a schematic illustration for explaining the spatial position between the luminaire and the object.

An embodiment of a system 1 for monitoring the irradiation of an object 2 with light 3 from a luminaire 4 according to the present invention is shown in the diagrams of FIG. 1 to FIG. 3. In the schematic illustration, the object 2 is depicted by way of example as an artwork, e.g. as an oil painting with a pigment-containing layer of paint 24 on a carrier material 21, such as a canvas. The object 2 furthermore has a frame 23 and a surface 22, which is formed by the layer of paint 24 and is irradiated with light 3 by the luminaire 4 so that it can be viewed.

The luminaire 4 used here is, purely by way of example, a spotlight, although it may equally well be a floodlight, a downlight or another type of emitter. The luminaire has a number of LEDs 41, of which only one LED 41 is shown in the schematic illustration. The light emitted by the LEDs 41 is expanded by an optical unit 42—illustrated schematically in FIG. 1 as a lens. It can also be a lens system and/or a reflector. The distance between the LEDs 41 and the optical unit 42 or parts thereof (for example objective lenses) can be set for example to attain a desired beam expansion or focusing, with the result that for example optimum lighting of the surface 22 of the object 2 that is as homogeneous as possible is achieved.

A light sensor 43, which is placed in the region of the emitted light 3 of the LEDs 41, is provided in the luminaire 4. The light sensor 43 is set up to measure an illuminance of the light 3 passing through the active area thereof. The light sensor 43 is connected to a control apparatus 44 of the luminaire 4, which receives the measurement signal from the light sensor 43, evaluates it, and wirelessly transmits the measurement data concerning the illuminance via a transmission and receiving unit 45 of the luminaire 4 to a smartphone 6 or a computing unit 60 provided therein. It is to be understood that the smartphone 6 has a transmission and receiving unit (not shown) that corresponds to the unit 45. Communication can be effected for example via a WLAN and/or ZigBee connection. Intermediate stations (not shown) such as bridges or even routers (Internet) can be provided in that case. Relevant here is only the connection (here wireless to some extent) between the light sensor 43 or the control apparatus 44 and the computing unit 60, so that the latter receives the data relating to the instantaneously measured illuminance.

The light sensor 43 measures the illuminance repeatedly in short temporal intervals, which can be controlled by the control apparatus 44, for example in intervals of 1 second. The measured illuminance is dependent on the placement, that is to say on the distance from the LEDs 41 and an angle deviation relative to an optical axis 49 (see FIG. 3) of the luminaire 4, if for example a light intensity along said optical axis 49 is at a maximum and decreases with an increasing angle deviation as viewed from the light sources (that is to say it is not a Lambertian emitter), and on the orientation of the light sensor 43 relative to the light 3 that is incident thereon. With a given fixed placement, the measured illuminance is a measure of the total light 3 that is emitted onto the surface 22 of the object 2.

Alternatively or in addition to the light sensor 43, a current measurement apparatus 47 can be provided in the luminaire 4—as is also shown in FIG. 1. The light sources (LEDs 41) are provided with voltage and current by a switching power supply with a power supply unit 46, wherein the current consumed by the LEDs 41 can be measured in the power supply unit 46 by way of the current measurement apparatus 47. The current generally correlates to the illuminance. The measured current measurement value is transmitted via a corresponding signal line to the control apparatus 45, which evaluates the signal and transmits the current measurement value to the computing unit 60 of the smartphone 6 in the same way as described above.

According to various embodiments, a memory is provided for example in the smartphone 6, in the intranet of the exhibitor, on the Internet or in a cloud 7, the former being referred to here as a third memory 63, in which a function or table is stored that represents a relationship between a measured current measurement value and an actual illuminance (or a variable that is analogous thereto, such as the luminous flux, the light intensity, etc.) in dependence on a specified total operating time of the light sources or LEDs 41. The values for the table can be determined in advance by way of experiment and measurement. This function or table takes into account the aging effect or degradation of the LEDs in accordance with which the light output produced by the current decreases over time.

Furthermore, information relating to the total operating time of the LEDs 41 is also required. This information can likewise be stored in the third memory 63 or in another memory of the smartphone 6, or in a memory assigned to the control apparatus 44 in the luminaire 4, etc., which is continuously updated, for example, by the control apparatus 44 or the computing unit 60. It is just as possible to provide a timer 441 in the luminaire 4 (see example of FIG. 1), which records the operating time of the LEDs. Here, the switch-on time duration since the LEDs 41 were activated is measured.

The computing unit 60 in the smartphone 6 is here set up, by way of programming, to use the instantaneous current measurement value and the instantaneous total operating time as arguments in the function or table in the third memory 63 and to then read therefrom the assigned illuminance or an analogous variable (luminous flux, light intensity, etc.).

According to various embodiments (light sensor 43 on the one hand and current measurement apparatus 47 in combination with a third memory 63 on the other), the computing unit 60 is thus enabled to receive an instantaneous value of an illuminance in the luminaire 4.

According to one modification (not shown) of the embodiment, the light sensor 43 is set up to represent the illuminance in dependence on the wavelength or for different wavelength ranges, e.g. in the IR range, in the visible range, and in the UV range. To this end, a plurality of light sensors 43 that in each case cover a different wavelength range can also be provided.

In the case of the current measurement apparatus 47, it is possible to measure only the current, such that there is no indication of the wavelength spectrum. Instead, the distribution of the illuminance over the wavelength ranges for the instantaneously used types of LEDs 41 can additionally be stored in the third memory 63 of the smartphone 6 or in a corresponding memory of the luminaire 4, etc. This information can have been determined and entered in advance by way of experiment and measurement. In a further refinement, a shift of the spectrum of the emitted light caused by aging of the LEDs 41 can be taken into account in the function or table. In other words, the distribution of the illuminance over the wavelength ranges is also taken into account in dependence on the instantaneous total operating time of the LED 41.

By taking the wavelength range into account, monitoring of the irradiation exposure of the surface 22 of the object 2 is further improved because illumination tends to be the more damaging for an object 2 the shorter the relevant wavelengths are, which manifests itself for example in bleaching of red colors or color pigments, which absorb the high-energy blue radiation, while blue colors or color pigments more strongly reflect the blue radiation.

The radiation emitted by the luminaire 4 is incident on the surface 22 of the object, wherein it is possible to determine an intensity distribution on said surface or to calculate it by way of the system 1 according to various embodiments, as is illustrated in FIG. 2. In the purely schematic illustration, iso-intensity lines are plotted, wherein two maxima $I_1$, $I_2$ can be seen, one of which ($I_1$) at the center of the surface and a smaller one ($I_2 < I_1$) somewhat remote therefrom. On the one hand, this is to be an artefact that is due to the radiation pattern of the luminaire 4, and, on the other hand, this maximum occurs in the direction of an upper side 22a of the surface 22 which owing to the geometric arrangement is positioned closer to the luminaire 4 than the opposite lower side 22b of the object 2, which is why the intensity profile "buckles" slightly in this direction. Although the intensity maximum $I_2$ is smaller than that of $I_1$, said intensity can be crucial for the intensity of the luminaire overall which is maximum after adaptation since it is incident for example on a region of the object that is particularly light-sensitive, while the higher intensity maximum $I_1$ is incident on a less light-sensitive portion of the object.

The geometric arrangement causing this is shown in FIG. 3. The object 2, or artwork, is secured or hung on a wall 8a of a room, for example an exhibition, and is illuminated at an angle by the luminaire 4 which is attached for example to a ceiling 8b above. The cone of emitted light 3 expanded by the optical unit 42 of the luminaire 4, or the optical axis 49 thereof, is consequently incident on the object 2 at an angle α that deviates from the surface normal of the surface 22 (or the angle relative to the plane of the surface is 90°−α). In order to calculate the intensity distribution on the surface 22, said oblique incidence is also taken into account by the computing unit 60. To this end, a tilt sensor 48b is provided on or in the luminaire 4, and said tilt sensor measures the tilt of the luminaire 4 in the configured state and transmits the result to the control apparatus 44, which passes it on to the computing unit 60.

Furthermore, an ultrasonic sensor 48a is provided on or in the luminaire 4, and said ultrasonic sensor 48a measures in the configured state of the luminaire 4 for example the distance d from the wall 8a to which the object 2 is attached and likewise transmits the result to the control apparatus 44, which again passes it on to the computing unit 60. The results are stored or saved on the smartphone 6 in a first memory 61, connected to the computing unit, in the form of information relating to the spatial positioning of the luminaire 4 relative to a surface 22 of the object 2. The storage location can also be provided in the luminaire 4, in the intranet of the exhibitor, in the Internet, or in the cloud 7, etc. Merely the fact that the computing unit 60 can access it is relevant.

The information relating to the distance d and/or the tilt angle α can alternatively also be input manually—without sensors—and be stored in the first memory 61. In addition, a lateral tilt angle or a lateral offset (perpendicular to the distance d) of the luminaire 4 relative to the center of the surface 22 can also be input and stored in the first memory 61. The information relating to the spatial positioning of the luminaire 4 relative to a surface 22 of the object 2 must uniquely identify a position and orientation of the object surface 22 relative to the luminaire 4 so as to ensure secure mathematical projection or interpolation of the beam path through the computing unit 60.

In addition, a radiation pattern of the luminaire 4 is stored in a second memory 62 of the smartphone 6. This radiation pattern can have been measured once, for example after the manufacturing of the luminaire 4, or once for all luminaires of said type. The radiation pattern denotes a direction-dependent emission of the light or light intensity of a luminaire. In this embodiment, it can be represented by a two-dimensional intensity distribution in a plane perpendicular to the optical axis 49 at a specific distance from the luminaire 4. Owing to the distance of the plane from the luminaire 4 and a distance of a point in the plane from a point of intersection of the plane with the optical axis 49, it is possible to determine an angle at which the intensity of the radiation pattern can be further projected onto the surface 22 of the object at each point, wherein the corresponding distance from the computing unit 60 can be obtained from the information relating to the spatial positioning between the luminaire 4 and the surface 22 so as to take into account the intensity that decreases with the distance through the beam expansion.

The illuminance that has in fact been measured and is transmitted by the control apparatus 44 should be used in the calculation as a reference value to calibrate the radiation pattern. The placement of the light sensor 43 in the plane or planes of the radiation pattern should here, for example, be taken into consideration and a corresponding multiplication factor for the intensities should be derived.

The information relating to the radiation pattern indicated can also be a plurality of intensity distributions in a plurality of planes at different distances from the luminaire 4, with the result that the desired profile of the intensity distribution on the surface 22 of the object 2 can be calculated using the computing unit 60 by way of interpolation or extrapolation between the planes. To this end, the surface 22 can be divided into a grid or matrix, wherein the local illuminance is calculated for each grid point in dependence on the location in the relevant plane of the radiation pattern and the distance from the luminaire 4, wherein a second plane of the radiation pattern (a plane at a distance "before" the considered position on the object 2, a different plane at a distance "behind" the considered position on the object 2) can also be used and interpolation can then be performed. The grid points can be arranged at a distance of a few millimeters to a few centimeters.

As mentioned, it is relevant, and should be taken into account in the information relating to the spatial positioning between the luminaire 4 and the surface 22 of the object 2, how the optical axis, that is to say a main beam direction, of the luminaire 4 is oriented relative to the surface 22, because the radiation pattern itself is referred to said optical axis 49 or main beam direction. In the ideal case, the main beam direction is centered with respect to the center of the surface 22.

Consequently, the computing unit 60 is able to calculate, on the basis of the information relating to the spatial positioning of the luminaire 4 relative to the surface 22 of the object 2, which is stored in the first memory 61, of the information relating to the radiation pattern, which is stored in the second memory 62, and of the illuminance of the luminaire 4, which has been calculated using data in the third memory 63 or has been transmitted directly, a local intensity for any positions on the surface 22 of the object 2 to obtain a distribution as shown in FIG. 2.

The local intensity or illuminance on the surface 22 should not exceed a specific maximum limit value so as to prevent damage for example to the applied paint, the pigments, the binder, or the carrier, etc., of the object 2. As described, a maximum illuminance on the illuminated object 2 viewed as a whole can be considered to be critical (absolute limit value applicable for the entire surface 22). However, various embodiments also makes it possible to consider how the individual surface regions (for example the locally differing pigments or materials of the object) react to the illumination. For example, inorganic pigments such as zinc white or ultramarine are generally more lightfast than organic colorants.

The computing unit 60 is therefore designed to receive sensitivity information for the object 2 that is to be irradiated including limit values for a maximum local intensity for individual positions on the surface 22 of the object 2 in dependence on the combination for example of applied paint, pigments, binders, and carriers, etc. The computing unit 60 thus calculates the local intensity for at least one of the multiplicity of positions as described above and then compares it to a corresponding, individual limit value specified in the sensitivity information for said position. In dependence on the result, it outputs a signal, for example a warning signal.

The sensitivity information includes an assignment of the positions on the surface 22 of the object 2 to limit values, which can be defined for example by way of the blue scale (ISO 1-8) or a light sensitivity category classification according to Colby 1991 (categories 1 to 3; source: see above). One example is shown in table 1:

TABLE 1

| Category (ISO) | 1 | 2 | 3 | 4 | 5 | 6 | 7 | 8 |
|---|---|---|---|---|---|---|---|---|
| Limit value for first bleaching effect [Mlxh] | 0.4 | 1.2 | 3.6 | 10 | 32 | 100 | 300 | 900 |
| Category (Colby) | 1 (sensitive) | | | 2 (intermediate) | | | 3 (durable) | |
| Limit value (short term) [Lux] | 50 | | | 100 | | | 200 | |
| Limit value (long term) [Lxh/a] | 15,000 | | | 40,000 | | | 150,000 | |

Category 1 may include: most organic dyes, magenta, verdigris (copper acetate), chromium yellow, chromium red, smalt, pastel, tinted papers, older color photos, Polaroids, felt-tip pen, most natural textile colorants, feathers, colored printing inks, turmeric, etc.

Category 2 may include: manganese blue, Prussian blue, zinc yellow, cadmium yellow, vermilion, carmine, wood pulp paper or card, new photographs, Kodachrome slides, vermilion, Indian yellow, etc.

Category 3 may include: ivory black, titanium white (rutile), zinc white, cobalt violet, ultramarine, cobalt blue, chromium green, malachite, earth colors, Naples yellow, lead tin yellow, orpiment, good quality rag papers, carbon-based inks, black-and-white gelatine photographs, indigo on wool, earth colors, plastics (PE), etc.

Assignment of individual positions on the surface to the categories and thus to the limit values via image recognition can be performed using a camera 9, which can also be part of the luminaire 4, for example, in an automated fashion. To this end, a downstream, for example digital, image recognition and evaluation unit 91 can be provided, which stores in this specific embodiment the thus obtained sensitivity information in a fourth memory 71 in a cloud 7. The computing unit 60 can again access this fourth memory 71 to perform the individual comparison for each position.

According to various embodiments, the smartphone 6 furthermore has a dedicated camera 64. An identifier 25 provided on the object, such as e.g. a QR code, can be read using said camera 64. Said QR code makes it possible for the computing unit to access the sensitivity information for the object 2 to be irradiated that is stored in the fourth memory 71. Alternatively or in addition thereto, the smartphone 6 can have an NFC read function (not shown) with which it reads an NFC tag provided on the object, which includes a corresponding unique identifier. If an art object 2 is moved for example from one museum to another, the earlier information can be correspondingly stored and coded, and access is possible via the cloud 7.

In the above table 1, short term limit values are provided that must not be exceeded in terms of spatial resolution. For watercolors or oil paintings (category 1), for example the value of 50 Lux should not be exceeded. For extremely lightfast colors, such as zinc white (category 3), by contrast, 200 Lux can be stored as the limit value.

Furthermore, long-term limit values are likewise indicated in terms of spatial resolution—considered over the year. For sensitive objects based on textiles or watercolors (category 1), for example 15,000 luxhours per annum can be given as a limit value. For less sensitive objects, for example based on oil paints, a significantly higher limit value can be specified, for example 150,000 luxhours per annum.

For the comparison to the long-term values, the computing unit can temporally integrate before the comparison the local intensity values that have been recorded for example since the beginning of the year in order to use the same comparison standard. Alternatively, the computing unit 60 can have available opening times of the exhibitor or the museum, or the latter may be retrievable for the computing unit 60, in order to multiply the calculated intensity by said time. In this connection, it is likewise possible to consider the entry in table 1 in the line "first bleaching effect" as a limit value to be compared.

If the computing unit 60 determines that the limit value is exceeded or there is the risk that it will be exceeded in future, the output of the luminaire 4 can be reduced. In the extreme case, the luminaire 4 can be switched off by regulating the power supply 46 of the luminaire 4 via the control apparatus 44 in dependence on the signal output by the computing unit 60. In various embodiments, this case can already occur if a limit value is exceeded merely in a very sensitive partial region of the surface 22 of the object 2. In other words, the system 1 permits a much more accurate and early initiation of measures. In the reverse, it is possible with specially adapted lighting of the surface 22 for example with a reduced intensity only at the sensitive locations to significantly increase the yearly irradiation time of the object 2.

Furthermore, data relating to the ambient light can also be fed to the computing unit 60 if there are further artificial or natural light sources (for example incoming daylight). These can also be measured with a further sensor of the system 1 at the luminaire 4, in the room or on the smartphone 6 and serve the computing unit 60 as information about a base illumination below which the illumination must not fall. Should the ambient light alone result in the limit values being exceeded, it is possible for a warning to be output by the computing unit 60 for this reason alone. This can apply e.g. to UV radiation, because UV radiation particularly strongly damages colors and materials.

Figure 4:
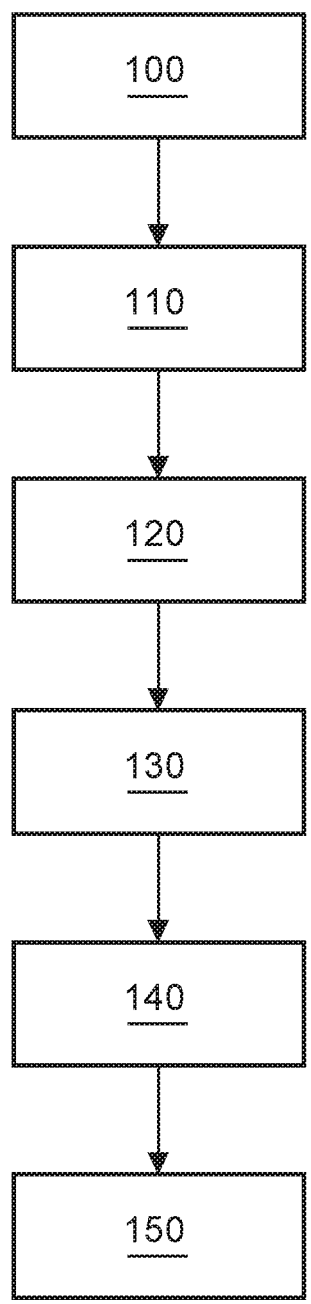
FIG. 4 shows a flowchart with an overview of processes of various embodiments of the method.

FIG. 4 once again shows an overview of the process of the correspondingly performed method in a flowchart.

In 100, information relating to an illuminance of the light emitted by the light sources 41 is provided by the luminaire and transmitted to the computing unit 60.

In 110, information relating to the spatial positioning of the luminaire relative to a surface 22 of the object 2 is transmitted from a first memory 61 to the computing unit 60, or said information is retrieved by the computing unit 60.

In 120, information relating to the spatial radiation pattern of the light sources 41 is transmitted to, or retrieved by, the computing unit 60.

In 130, for a multiplicity of positions on the surface 22 of the object 2, a local intensity of the light that is incident at the respective position is calculated, in each case by way of the computing unit 60, from the provided information relating to the illuminance, from the information relating to the spatial radiation pattern of the light sources 41, and from the information relating to the spatial positioning of the luminaire 4 relative to the surface 22 of the object 2.

In 140, sensitivity information for the object 2 that is to be irradiated is transmitted to the computing unit 60, in which limit values for a maximum local intensity are stored for the positions on the surface 22 of the object 2.

In 150, the computing unit 60 compares the calculated local intensity for the multiplicity of positions to in each case the limit value specified in the sensitivity information for said position and outputs in dependence on the result a signal that is returned for example to the luminaire or the controller thereof so as to adapt the power supply thereof.

It should be noted that the above described embodiments represent specific embodiments and do not limit the scope of protection defined by the attached claims. By way of example, individual features of the individual embodiments can also be combined to form respectively other embodiments or modifications.

For example, FIG. 1 illustrates a control apparatus 44 in a luminaire. As described, the system 1 can be an illumination system having many connected luminaires 4, which are interconnected by way of a bus, e.g. a DALI bus or the like. The control apparatus 44 can here be a central control apparatus, which retrieves the values of the described sensors and transmits them via an interface to the smartphone 6.

Furthermore, the invention is not limited to smartphones having computing units. It is clear to a person skilled in the art that the computing unit can also be located centrally and remote from the object, for example in a PC.

Furthermore, the camera 9 with evaluation unit has been described as an independent apparatus. It is however just as possible for these corresponding functions to be realized by way of the smartphone 6 with its camera and computing unit, or by way of a further smartphone, which is not illustrated.

Furthermore, first, second, third and fourth memories and further memories were described in connection with an assignment to apparatuses (luminaire, smartphone, cloud, etc.). These memories, however, can be arranged in each case individually or integrated in common storage modules in a respectively different one of the apparatuses, provided the described access for performing the functions and calculations is permitted.

LIST OF REFERENCE SIGNS

1 System, illumination system
2 Object
3 Light, radiation
4 Luminaire
6 Smartphone
7 Cloud
8*a*, 8*b* Wall, ceiling
9 Camera
21 Carrier material (object)
22 Surface
22*a*, 22*b* Upper side, lower side (surface of the object)
23 Frame
24 Applied paint
25 Identifier of the object, QR code, NFC tag
41 LEDs
42 Optical unit
43 Light sensor
44 Control apparatus
45 Transmission/receiving apparatus
46 Power supply
47 Current measurement apparatus
48*a*, 48*b* Tilt sensor/distance sensor
49 Optical axis, main beam direction
60 Computing unit
61 First memory (spatial positioning)
62 Second memory (radiation pattern)
63 Third memory (current and illuminance versus operating time)
64 Camera (smartphone)
71 Fourth memory (sensitivity information)
91 Evaluation unit (image recognition)
100 Providing information relating to an illuminance of the light emitted by the light sources and transmitting to computing unit
110 Transmitting information relating to the spatial positioning of the luminaire relative to the surface of the object from first memory to computing unit
120 Transmitting information relating to the spatial radiation pattern of the light sources from second memory to the computing unit
130 Calculating the local intensity of the light that is incident at the respective position for a multiplicity of positions from the information relating to the illuminance, relating to the spatial radiation pattern, and from the spatial positioning of the luminaire
140 Transmitting sensitivity information for the object that is to be irradiated to the computing unit, in which limit values for a maximum local intensity are stored for the positions on the surface of the object
150 Comparing the calculated local intensity for the respective positions with the respectively specified limit values in the sensitivity information, and outputting a signal in dependence on the result, for example to the luminaire or to the controller thereof for adapting the power supply While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A system for monitoring the irradiation of an object with light from a luminaire, the system comprising:
the luminaire having in each case one or more light sources, which together emit light having a spatial radiation pattern;
a computing unit, which is connected to the luminaire and is set up to acquire information relating to an illuminance of the light emitted by the light sources; and
a first memory, which is connected to the computing unit and in which information relating to the spatial positioning of the luminaire in relation to a surface of the object is stored;
a second memory, which is connected to the computing unit and in which information relating to the spatial radiation pattern of the light sources is stored;
wherein the computing unit is designed to calculate and output for a multiplicity of positions on the surface of the object in each case a local intensity of the light that is incident at the respective position on the basis of the information relating to the illuminance, the information relating to the spatial radiation pattern of the light sources, and the information relating to the spatial positioning of the luminaire relative to the surface of the object;

a time measurement apparatus, which is designed to output an operating time for the light sources during which the light sources have been operating for irradiating the object since their activation;

at least one of a current or voltage measurement apparatus, which is designed to measure at least one of a current or a voltage with which the light sources are operated;

a third memory, in which a function or table is stored with which values of an illuminance are on the one hand assigned in each case to a combination of values from at least one of a current or a voltage and, on the other, to an operating time of the light sources;

wherein the computing unit is connected to the time measurement apparatus, the at least one of the current or voltage measurement apparatus, and the third memory and is designed to correspondingly receive in each case the measured values for the at least one of the current or the voltage and also the operating time and to calculate the information relating to the measured illuminance with reference to the function or the table.

2. The system of claim 1, further comprising
a light sensor, which is provided in or next to the luminaire and is designed to measure the illuminance of the light in the luminaire emitted by the light source(s);

wherein the computing unit is connected to the light sensor to receive the information relating to the measured illuminance.

3. The system of claim 1,
wherein the computing unit is designed to obtain sensitivity information for the object that is to be irradiated, in which limit values for a maximum local intensity are stored for positions on the surface of the object.

4. The system of claim 3,
wherein the computing unit is designed to compare the calculated local intensity for at least one of the multiplicity of positions to a limit value specified in the sensitivity information for this position and to output a signal in dependence on the result.

5. The system of claim 4,
wherein the signal can be received by a control apparatus, which is connected to the computing unit and is designed to adapt or switch off a power supply of the luminaire or of individual light sources of the luminaire in dependence on the signal.

6. The system of claim 3,
wherein the information relating to an illuminance of the light emitted by the light sources that is obtained by the computing unit includes details relating to illuminances with respect to one or more different specified wavelength ranges; and wherein the sensitivity information for the object that is to be irradiated obtained by the computing unit includes for the respective positions on the surface of the object in each case limit values for the one or the plurality of different specified wavelength ranges;

wherein the computing unit, if it is designed to compare the calculated local intensity for at least one of the multiplicity of positions to a limit value specified in the sensitivity information for said position and to output a signal in dependence on the result, in each case individually performs said comparison for the one or the plurality of different specified wavelength ranges.

7. The system of claim 3,
wherein a mobile unit that is wirelessly connected to the luminaire furthermore has a camera or an apparatus for near-field communication, with which an identifier provided on the object can be read, which identifier makes access to the sensitivity information for the object to be irradiated that is stored in a fourth memory possible.

8. The system of claim 1,
wherein the information relating to the spatial positioning of the luminaire relative to a surface of the object includes data concerning a distance between the light source or light sources and a reference point of the surface of the object and also a tilt angle at which the luminaire is positioned in deviation from a surface normal or from a plane of the surface.

9. The system of claim 8,
wherein the luminaire has a distance sensor, which is designed to measure a distance between the luminaire and the surface and to transmit the measurement result to the computing unit.

10. The system of claim 9,
wherein the distance sensor comprises an ultrasonic sensor.

11. The system of claim 1, further comprising:
a tilt angle sensor designed to measure a tilt angle at which the luminaire is positioned in deviation from a surface normal or from a plane of the surface and to transmit the measurement result to the computing unit.

12. The system of claim 11,
wherein the tilt angle sensor is provided in the luminaire or on the surface of the object.

13. The system of claim 1,
wherein the information relating to the spatial radiation pattern of the light sources or of the luminaire includes data with a two-dimensional distribution of intensities on an area, or in each case on a plurality of areas with different distances from the light source(s), perpendicular to an optical axis of the light emitted by the light sources of the luminaire;

wherein the computing unit is designed to effect the local intensity at the respective positions on the surface of the object on the basis of mathematical projection or an interpolation or extrapolation starting from the one area or between the plurality of areas.

14. A system for monitoring the irradiation of an object with light from a luminaire, the system comprising:
the luminaire having in each case one or more light sources, which together emit light having a spatial radiation pattern;

a computing unit, which is connected to the luminaire and is set up to acquire information relating to an illuminance of the light emitted by the light sources; and a first memory, which is connected to the computing unit and in which information relating to the spatial positioning of the luminaire in relation to a surface of the object is stored;

a second memory, which is connected to the computing unit and in which information relating to the spatial radiation pattern of the light sources is stored;

wherein the computing unit is designed to calculate and output for a multiplicity of positions on the surface of the object in each case a local intensity of the light that is incident at the respective position on the basis of the information relating to the illuminance, the information relating to the spatial radiation pattern of the light sources, and the information relating to the spatial positioning of the luminaire relative to the surface of the object;

wherein the computing unit is designed to obtain sensitivity information for the object that is to be irradiated, in which limit values for a maximum local intensity are stored for positions on the surface of the object;

wherein the luminaire or a mobile unit of the system that is wirelessly connected to the luminaire furthermore has a camera with which the surface of the object can be scanned to obtain at least one of color or brightness values for positions on the surface;

wherein the computing unit is designed to receive the position-dependent at least one of color or brightness values from the camera and to calculate a limit value for each of the positions on the basis of a fixedly specified assignment between the at least one of color or brightness values and a sensitivity.

15. The system of claim 14, wherein the mobile unit that is wirelessly connected to the luminaire is a smartphone, in which additionally the computing unit is set up;

wherein at least one of the first memory, the second memory or the third memory is/are set up in the smartphone or in a cloud that is accessible for the smartphone.

16. A system for monitoring the irradiation of an object with light from a luminaire, the system comprising:

the luminaire having in each case one or more light sources, which together emit light having a spatial radiation pattern;

a computing unit, which is connected to the luminaire and is set up to acquire information relating to an illuminance of the light emitted by the light sources; and a first memory, which is connected to the computing unit and in which information relating to the spatial positioning of the luminaire in relation to a surface of the object is stored;

a second memory, which is connected to the computing unit and in which information relating to the spatial radiation pattern of the light sources is stored;

wherein the computing unit is designed to calculate and output for a multiplicity of positions on the surface of the object in each case a local intensity of the light that is incident at the respective position on the basis of the information relating to the illuminance, the information relating to the spatial radiation pattern of the light sources, and the information relating to the spatial positioning of the luminaire relative to the surface of the object;

wherein the computing unit is designed to obtain sensitivity information for the object that is to be irradiated, in which limit values for a maximum local intensity are stored for positions on the surface of the object;

wherein a mobile unit that is wirelessly connected to the luminaire furthermore has a camera or an apparatus for near-field communication, with which an identifier provided on the object can be read, which identifier makes access to the sensitivity information for the object to be irradiated that is stored in a fourth memory possible.

* * * * *